July 22, 1924.
G. F. GROOMS
VEHICLE FOR TRANSPORTING POLES
Filed Jan. 22, 1923
1,501,996
3 Sheets-Sheet 3
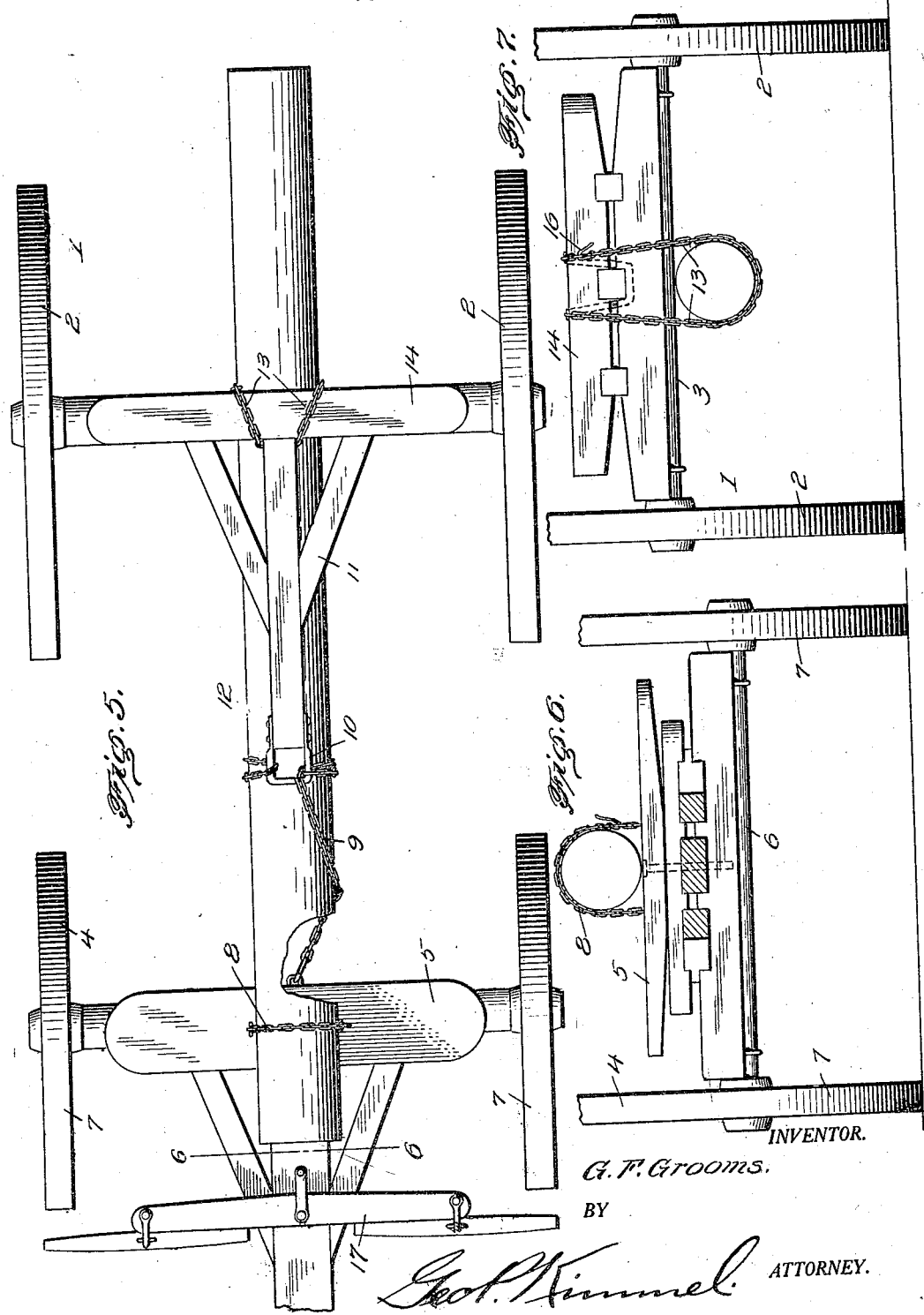
INVENTOR.
G. F. Grooms.
BY
Geo. F. Kimmel
ATTORNEY.

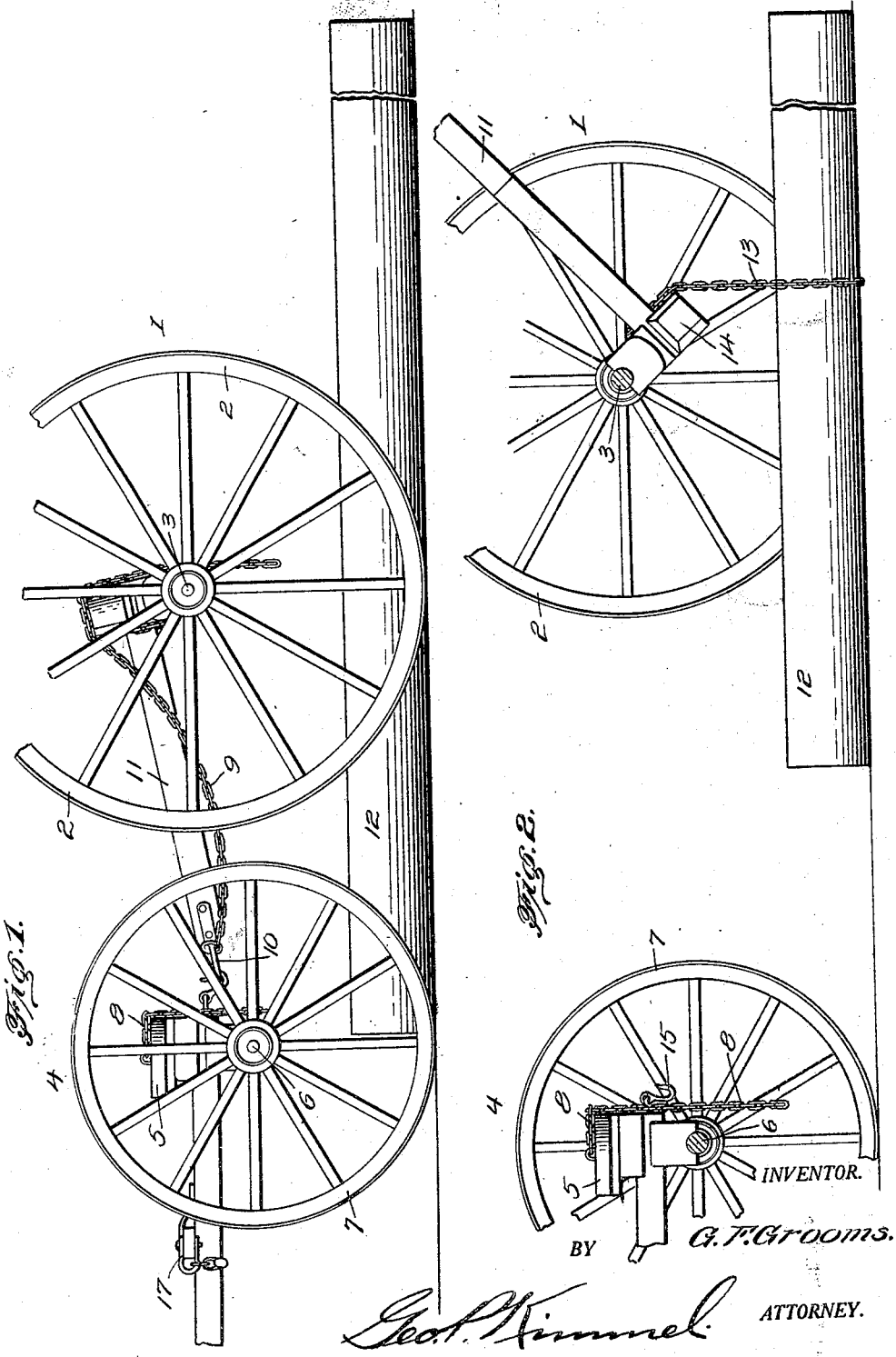

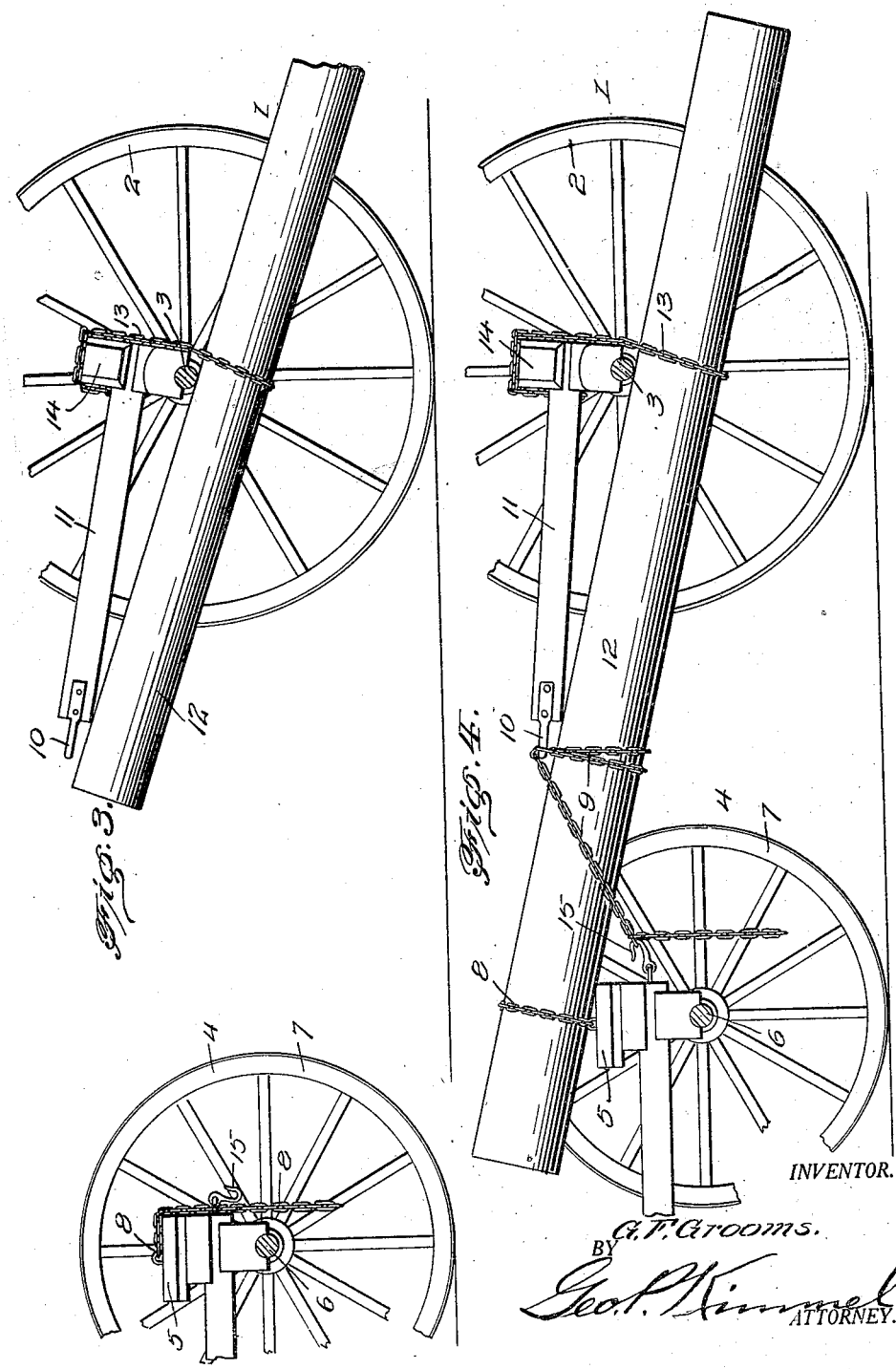

Patented July 22, 1924.

1,501,996

UNITED STATES PATENT OFFICE.

GEORGE F. GROOMS, OF SABINAL, TEXAS.

VEHICLE FOR TRANSPORTING POLES.

Application filed January 22, 1923. Serial No. 614,196.

*To all whom it may concern:*

Be it known that I, GEORGE F. GROOMS, a citizen of the United States, residing at Sabinal, in the county of Uvalde and State of Texas, have invented certain new and useful Improvements in Vehicles for Transporting Poles, of which the following is a specification.

This invention relates to trucks or vehicles for transporting stems or poles, and its object is to provide means for the ready loading of the stems onto or unloading them from the vehicle without undue strain on the vehicle during said loading or unloading.

The vehicle comprises a front truck and a rear truck with means whereby the stems, of any appropriate length, may be loaded onto the vehicle or unloaded therefrom with the stem itself employed as a means for providing sufficient leverage to raise the stem onto the vehicle or deposit it therefrom.

The vehicle or wagon employed comprises a front pair of wheels and a rear pair of wheels with the front pair of wheels having a broad bolster in order to steady the wagon, when loaded with a drill stem, and the front and hind wheels are coupled together when not loaded with the drill stem.

In order to load the drill stem onto the wagon, the front and rear wheels are uncoupled, the rear wheels are run back over the stem, the reach is then swung up and backward shifting the bolster from over the axle of the other side. The stem is then chained to the bolster, at a point forward of the center, the reach is raised and swung back to its proper position, thus raising the front end of the stem. The front truck is then moved into the position under the uplifted forward end of the stem, and the stem is secured to the top of the bolster of the front truck. The stem is then unfastened from the rear bolster, the rear wheels are moved back to a point between the center and the rear end of the stem, the reach is swung up and back as in the first instance, and the depending bolster is then secured to the stem at this point. After securing the stem to the bolster, the reach is swung back to its original position, thus lifting the rear end of the stem in a suspended position beneath the rear axle. Further securing means are attached to the stem and passed forward and secured to the front bolster, after which the stem is ready for transportation.

This saves quite an amount of hard labor in the loading of heavy drill stems, sometimes weighing as much as 7500 lbs., and the breakage of the wagon and damage thereto is avoided, as well as often bending the drill stems in the unloading in the usual way.

After the drill stem is loaded and hauled to the place of destination, the chain, which is the means used to fasten the stem in place on the wagon or truck, is released by unfastening the chain and reversing the action above described. This lowers the back end of the drill stem, and the front wheels may then be taken off and the rear hounds reversed to be set forward again, and in this manner, the drill stem is laid on the ground.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claim.

In the drawings:—

Figure 1 is a plan view of a wagon or truck showing a drill stem in place on the ground below the same, in position to be secured to the truck members.

Fig. 2 is a longitudinal vertical section of the wagon or truck with the pole or stem below and in place to be fastened thereon.

Fig. 3 is a side elevation of the vehicle showing the forward and rear trucks separated, and with the rear truck reversed and lifting the stem.

Fig. 4 is a longitudinal vertical section of the two trucks with the pole or stem carried thereby and assembled with the front truck and secured thereto.

Fig. 5 is a plan view of the structure shown in Fig. 4.

Fig. 6 is a section on the line 6—6 of Fig. 5.

Fig. 7 is a rear elevation of the structure shown in Fig. 4.

Referring to the drawings, there is shown a rear truck 1 having a pair of wheels 2 mounted thereon and provided with an axle 3, to the opposite ends of which axle the wheels 2 are journaled. There is also provided a front truck 4 provided with a broad bolster 5 and having an axle 6 carrying front wheels 7.

When the two trucks are not carrying a stem or pole, they are joined together by means of a loop 10 carried at the end of the reach 11, which engages a hook 15 carried by the front truck.

The axle 3 of the rear truck 1 has mounted thereon a broad bolster 14, between which bolster and the axle, is connected one end of the reach 11, braced by the hounds 11'. The loop 10 above mentioned, is secured to the front end of the reach 11. The front truck 4 carrying the broad bolster 5 further has secured thereto, the tongue 17' and the double-tree 17. Secured to the top of the bolster 5, is a chain 8, the purpose of which will be described further on. The rear of the bolster 5 also carries a hook 15, which as described above, engages the loop 10 of the reach 11 to secure the two trucks together when they are not carrying a stem or pole.

In the operation of this device, the front and rear trucks are disconnected, the rear truck is shifted to straddle the stem 12, and is also positioned that the bolster 14 will be over the stem 12 at a point forward of the center thereof. In this position, the reach 11 which is normally extended forward, is raised and swung backward, carrying with it the bolster 14, which swings about the axle 3 as a pivot, until the parts assume the position shown in Figure 2 of the drawing. At this point, the chain 13 is passed about the rear of the reach and about the stem 12, securing the stem to the bolster 14. The reach is then swung forwardly again to its normal position, thus raising the forward end of the stem 12. While the stem is held in this position, the forward truck 4 is backed until the forward end of the stem is extended over the bolster 5 whereupon the chain 8 carried by this bolster is secured about the end of the stem, securing the same to the bolster. The first movement of the hound 11 is now repeated, bringing it again into the position shown in Fig. 2, to release the bolster from engagement with the stem 12. The securing chain 13 is loosened, and the truck 1 is moved backward toward the rear of the stem 12, whereupon the chain 13 is again passed about the stem, this time at the rear end thereof, and the rear end of the stem is made fast to the bolster 14. The reach 11 is now swung forward again for the second time, raising the bolster 14 to its normal position above the axle 3, and at the same time lifting the rear end of the stem clear of the ground. The forward end of the reach 11 is brought down until it touches the stem 12, as shown in Fig. 4, whereupon a chain 9 is passed about the stem and through the loop 10 and then extended forwardly to engage the hook 15. The stem is now secured in the position between the trucks 1 and 4, which will allow its ready transportation from point to point.

When it is desired to deposit the stem at a point of destination, the chain 9 may be uncoupled and the bolster 14 turned about the axle by means of the reach 11 until the stem is again lowered to the level of the ground.

Because of the leverage incident to the use of the reach 11, these operations are easily performed, even though the weight of the stem be large.

What is claimed is:—

The method of trucking stems or poles, consisting in disconnecting the rear reach of a four wheeled vehicle from the front truck, and positioning the rear truck over the pole to be transported, between the center and front end thereof, then swinging the reach and rear bolster upon the rear axle as a center of rotation, to lower the bolster between the axle and pole, securing the pole to the bolster, then swinging the reach and bolster back to normal position to raise the front end of the pole, then moving the front truck to position its bolster beneath the raised end of the pole, then securing the front bolster and overlying pole together, then again swinging the reach and rear bolster over as in the first movement, disconnecting the rear bolster from the log, then moving the rear truck back to the rear end of the log, and securing the still lowered rear bolster thereto, then swinging the reach and rear bolster back to normal position to raise and suspend the rear end of the pole beneath the axle of the rear truck, and then securing together the free end of the reach, the pole and the bolster of the front truck.

In testimony whereof, I affix my signature hereto.

G. F. GROOMS.